United States Patent Office 3,244,598
Patented Apr. 5, 1966

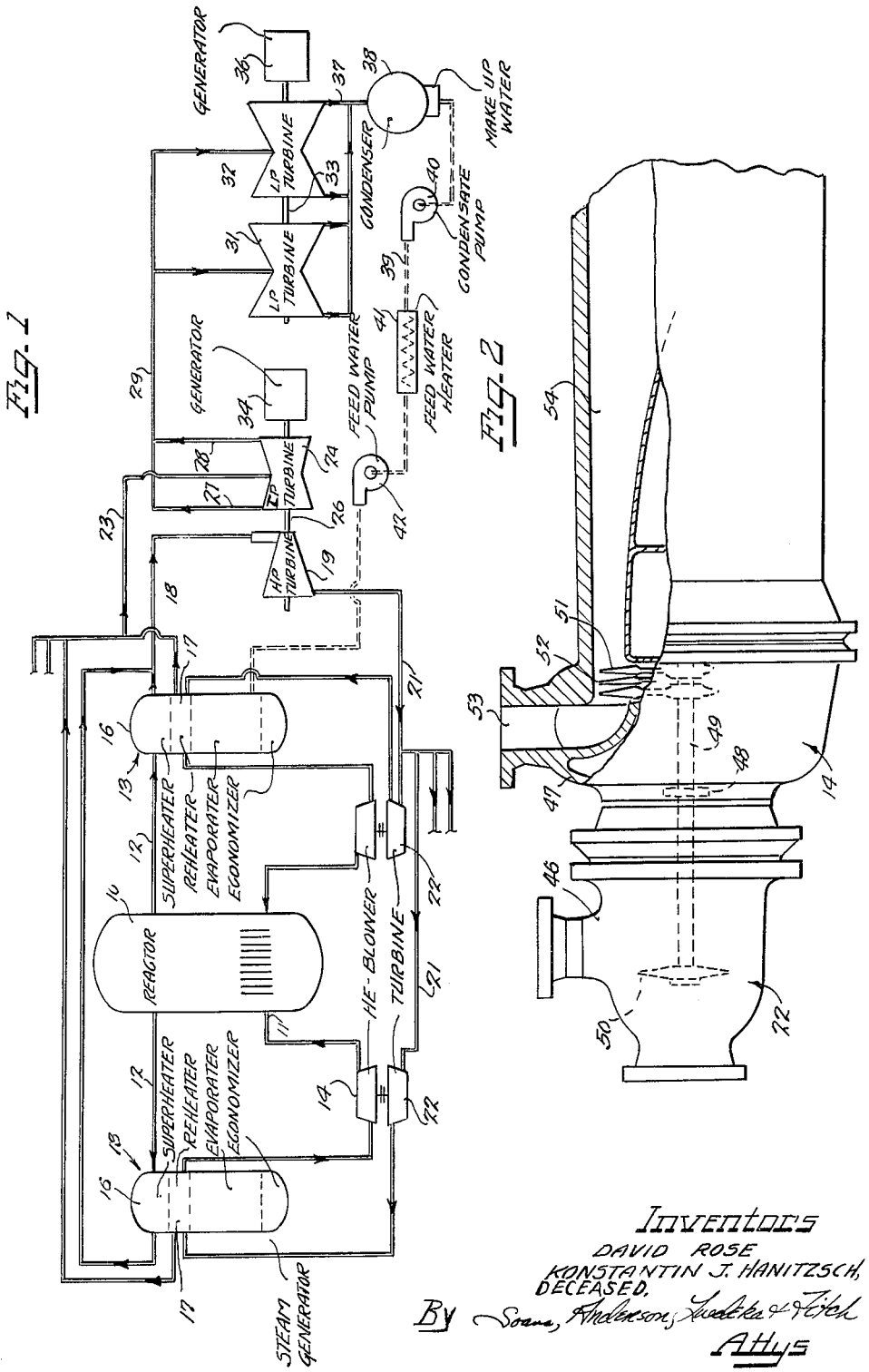

3,244,598
NUCLEAR REACTOR POWER CONVERSION
SYSTEM
David Rose, San Diego, Calif., and Konstantin Johann Hanitzsch, deceased, late of San Diego, Calif., by Ingrid Anna Helene Hanitzsch, widow and legal representative, assignors to General Dynamics Corporation, New York, N.Y., a corporation of Delaware
Filed Jan. 2, 1963, Ser. No. 249,972
3 Claims. (Cl. 176—60)

This invention relates to power conversion systems and more particularly to a power conversion system which can be utilized to effect the efficient production of electrical energy from thermal energy produced in a nuclear reactor.

Since the advent of nuclear power reactors substantial steps have been taken toward the efficient and economical production of electrical power from thermal energy derived from these reactors. The key to this ultimate goal lies in high temperature operation for the direct production of steam at high-efficiency steam turbine conditions. In this connection, present day reactor technology has led to the development of high temperature gas-cooled reactors which, when employed with a suitable steam turbine system, have the capability of producing electrical power compatible with present and foreseeable future unit capacity requirements of the utility industry. Examples of high temperature reactors that can be employed in such a power plant are disclosed and claimed in copending United States applications, Serial No. 775,-578 filed on November 21, 1958, now Patent No. 3,138,-535, Serial No. 74,290 filed on December 7, 1960, now Patent No. 3,201,320, and Serial No. 74,291 filed on December 7, 1960, now Patent No. 3,201,321.

In general, nuclear power plants are characterized by the employment of a nuclear power reactor which is confined within a pressure vessel through which a gas coolant such as helium or the like is circulated to effect the withdrawal of thermal energy liberated by the reactor. The gas coolant, which is heated as it is circulated through the reactor core, is supplied to a steam generator wherein the thermal energy withdrawn from the reactor is utilized to effect the production of superheated steam. The steam is thereafter circulated through a suitable steam turbine-electrical generating system employing one or more reheat stages. The operating conditions of the steam turbine system and the reactor are correlated to yield the most efficient generation of electrical power.

Although steam cycles, as described above, have been employed in the past, the efficiency and versatility of these units has been limited and various factors are responsible for these limitations. For example, as the nuclear power plant output increases the power required to circulate the gas coolant through the reactor likewise increases. Conventionally, the circulators previously employed to effect this circulation of the gas coolant have been driven by electrically powered motors that derive this operating power from the electrical output of the steam turbine generator system. However, to achieve high power requirements with electric motor driven circulators, the size of these units become very large and, in many cases, complex and inefficient gearing arrangements must be employed which further raises the cost of such units. Such large motors may be required, that these drivers become not only uneconomic but even technically unfeasible. Moreover, the need for a relatively compact power conversion system imposes space limitations which are contradictory to the use of extremely large size motor driven circulators.

Accordingly, it is a prime object of the present invention to provide an improved power conversion system for use in conjunction with an operating nuclear reactor.

A further object of the present invention is to provide a power conversion system which employs a steam turbine cycle including an auxiliary series steam turbine driven circulator that is utilized to more efficiently yield the necessary circulation rate for the heat extracting reactor coolant.

Still another object of the present invention is to provide an efficient steam turbine power conversion system including an auxiliary steam turbine driven circulator capable of yielding more efficient variable speed performance.

An additional object of the present invention is to provide a power conversion system employing a compact, efficient and relatively low cost steam turbine driven circulator for effecting the extraction of heat liberated by the reactor and for supplying same to a steam generator employed in the system.

A further object of the present invention is to provide a power conversion system employing a steam turbine driven circulator in that portion of the steam cycle which insures efficient circulator operation, minimizes the possibility of damaging effects on the steam turbine, reduces the drain on the power output of the main steam cycle, and simplifies integration within the overall steam system design.

Still another object of the present invention is to provide a power conversion system employing a steam turbine driven circulator which is situated within the steam cycle at a location such that the design of the steam turbine drive is greatly simplified.

Other objects and advantages of the present invention will become apparent from the following detailed description thereof when considered in conjunction with the accompanying drawings, wherein:

FIGURE 1 is a diagrammatic representation of a preferred embodiment of the power conversion system of the present invention; and, FIGURE 2 is a simplified diagrammatic illustration of one form of series steam turbine driven circular utilized in the system illustrated in FIGURE 1.

In general, the drawings illustrate a preferred embodiment of an improved power conversion system which employs a plurality of series steam turbine driven circulators to provide the desired flow rate of a gas coolant through a plurality of parallelly connected coolant loops of the power producing reactor. As shown, the gas coolant being circulated by the steam turbine driven circulator is delivered through parallelly connected coolant loops to a steam generator, one of which is located in each loop, thereby effecting the production of steam. The steam flow from the steam generators is combined and delivered to a high pressure turbine employed in the electrical power producing main steam turbine system.

After expansion through the high pressure turbine the steam is delivered through a plurality of parallelly connected reheat lines to reheater sections of each of the multiplicity of steam generators. Each of the steam turbines that drives the circulators is serially connected in one of the cold reheat lines. The steam leaving the reheater sections of the steam generators is combined and circulated through intermediate and low pressure turbine stages of the main steam turbine-electrical generating system. The low pressure turbines exhaust to a conventional condenser and the condensate is passed through the necessary feedwater heaters and feedwater pumping stages. This feedwater is recirculated through the steam generators to perpetuate the previously described cycle.

The following detailed description of the improved power conversion system will be premised on the utilization of the system in conjunction with a high temperature gas cooled reactor, as exemplified by those disclosed in the aforementioned copending United States applications. It should be emphasized that the described power conversion system, as such, imposes no inherent limitation on the electrical output capability of such reactor power plants. In order to encompass the full range of power desired, the number of parallel reactor coolant loops, each with its own individual series steam turbine driven gas circulator, steam generator and reheater, and/or the capacity of these individual components can be readily increased. Accordingly, the drawing (FIG. 1) illustrates two such loops; however to simplify the presentation of the invention, only one such loop will be described.

Referring in detail to FIGURE 1, there is disclosed a nuclear reactor generally designated by the numeral 10. As previously described, the reactor 10 is preferably a high temperature power reactor which employs a gas coolant such as helium. In this connection, a gas circulating inlet duct 11 communicates with the pressure vessel for the reactor and with the coolant circulating channels defined by the internal structural elements thereof. Similarly, a gas circulating outlet duct 12 communicates with the pressure vessel so as to provide an exit path for the coolant after it has been circulated through the reactor core to effect the extraction of the heat liberated by the core during operation of the reactor. The primary coolant loop of the power conversion system includes the inlet duct 11, the coolant channels provided within the reactor 10, the outlet duct 12, a steam generator 13 and a steam turbine driven circulator 14, which may either be of the centrifugal or axial flow type.

More particularly, the heated coolant which is discharged from the reactor 10 through the gas circulating outlet duct 12 is passed through the steam generator 13. The steam generator is designed to effect the generation of steam from the thermal energy derived from the heat extracting coolant that is circulated through the primary loop and may be any one of various types which includes a superheater section 16 and a reheater section 17.

The output from the superheater section 16 of the steam generator 13 is supplied to a high pressure turbine 19 through a conventional piping system 18. As hereinafter described, the high pressure turbine 19 constitutes one of the several turbines employed in a steam cycle that is utilized to produce electrical power from the heat liberated by the reactor 10. The superheated steam circulated through the turbine 19 to effect the driving thereof is partially expanded and then exhausted by the turbine. Thereafter, the exhausted steam is circulated through a suitable piping system 21 and is fed through a series steam turbine 22, which drives the circulator 14, to the reheater 17. As shown, the series steam turbine 22 is directly coupled to the circulator 14 and is located in the cold reheat line between the exhaust end of the high pressure turbine 19 and the reheater 17 of the steam generator. With the driving turbine 22 positioned at this location, a relatively high operating efficiency can be realized with a relatively compact turbine drive, and the possibility of damage to the turbine is minimized since the steam supplied thereto is in a dry state and essentially free from any moisture content.

The reheating cycle of the power conversion system employs the reheater 17 to resuperheat the steam supply that has been partially expanded by the high pressure turbine 19 and the series steam turbine 22. This reheating of the steam after partial expansion yields a further gain in system efficiency.

As shown in FIGURE 1, a suitable piping system 23 supplies the resuperheated steam from the reheater 17 to an intermediate pressure turbine 24. The intermediate pressure turbine 24, which is carried on a common shaft 26 with the high pressure turbine 19, is of a conventional type as are the remaining components of the main steam turbine electrical generating system. In this connection, the remaining units of the main steam turbine system and of the feedwater system are typical of such power plants that utilize a reheat steam cycle. Accordingly, the structural arrangement of the units in the overall system will be generically described, but it should be understood that various different types of units can readily be incorporated in these systems.

As shown, the dual exhaust outlets from the turbine 24 are connected through appropriate piping ducts 27, 28 and 29 to a pair of low pressure turbines 31 and 32 that are carried on a common shaft 33. The turbines 19 and 24, which are preferably housed in a single casing (not shown), drive an electrical generator 34 which is coupled to one extremity of the shaft 26. Similarly, the low pressure turbines 31 and 32 drive another electrical generator 36 that is connected at one extremity of the shaft 33.

The relatively low pressure steam which is exhausted from the low pressure turbines 31 and 32 is supplied through a suitable piping arrangement 37 to a steam condenser 38. The condensate supplied from the steam condenser 38, along with make-up water needed to compensate for losses which normally occur in the steam cycle, is fed through a conduit system 39 to the steam generator 13. The conduit system 39 has a condensate pump 40, a plurality of regenerative feedwater heaters (one of which is illustrated and designated by the numeral 41), and a feedwater pump 42 connected in series therewith.

FIGURE 2 diagrammatically illustrates the primary features of one embodiment of a suitable steam turbine driven circulator unit that provides the circulation of the gas coolant through the nuclear reactor 10 and steam generator 13. The steam turbine 22 is mounted within an insulated casing 46 which is connected to (or may be integral with) a casing 47 that houses the gas circulator 14. The casing 47 also houses a suitable thrust bearing member 48 which is carried on a shaft 49 that links the steam turbine drive with the circulator 14. The shaft 49, which links the steam turbine 22 and circulator 14, is supported on suitable journal bearings (not shown).

Although the steam turbine 22 and gas circulator 14 are illustrated in FIGURE 2 as being directly connected and close coupled, it should be understood that these units can be mounted on separate shafts which are connected through an intermediate coupling device. However, the preferred arrangement is that of a close coupled unit in which the shaft 49 has the rotor blade section 50 of the steam turbine secured thereto. Upon passage of steam through the cold reheat line from the high pressure turbine to the reheater, rotary motion is imparted to the shaft 49 and directly to the rotor blade section 51 of the circulator 14. As shown, stator blade sections 52 are incorporated with the rotor blade sections 51 of the circulator 14. The rotary motion imparted to the circulator 14 provides the energy required to circulate the coolant around the previously described primary loop. In this connection, the primary coolant passes through the steam generator 13, enters the circulator through an inlet 53 and passes out of the circulator through a diffuser section 54 that communicates with the inlet duct 11 to the nuclear reactor 10.

Although the diagrammatic illustration of the system presented in FIGURE 1 depicts the steam turbine driven circulator as being separated from the steam generator 13 which incorporates the reheater 17, this need not and preferably would not be the case. In this connection, the relatively compact size of the close coupled series turbine driven circulator admits arrangements of these units mounted directly on or integrally within the steam generator vessels.

In one preferred embodiment of the invention, the steam generator, upon being supplied with the coolant gas from the reactor 10, will deliver steam to the high pressure turbine at a temperature of 1000° F. and at a pressure of 2400 p.s.i.g. The pressure of the steam, after expansion through the high pressure turbine, will be reduced to approximately 690 p.s.i.g. at the inlet to the series steam turbine. After being expanded through the steam turbine 22 the steam pressure is reduced to approximately 500 p.s.i.g. The steam is then passed through the reheater wherein it is resuperheated to approximately 1000° F. and is thereafter delivered to the intermediate and low pressure turbines, condensed and recycled through the system.

From the foregoing it should be apparent that the present invention provides an improved power conversion system for use with a nuclear reactor. The system is constructed so that the high temperature operation desired can be realized to effect the economic production of steam with conditions applicable to modern, high efficiency steam turbine power plants. This result is achieved by providing a relatively low cost compact steam turbine driven circulator that efficiently provides the necessary circulator power and circulation rate for the heat extracting gas that is directed through the reactor. Moreover, the placement of the steam turbine in the cold reheat line of the steam cycle insures high efficiency operation of the steam turbine drive.

Various features of the invention are set forth in the following claims.

What is claimed is:

1. A system for effecting the conversion of thermal energy provided by a heat extracting medium that is circulated through the primary coolant loop of an operating nuclear reactor into usable electrical energy, which system comprises a steam generator connected to the reactor so that the medium circulated therethrough passes through said steam generator, said steam generator including a superheater section and a reheater section, a steam conversion unit connected to said steam generator for effecting the conversion of energy derived from the steam produced thereby into electrical energy, said conversion unit including a cold reheat line that provides a path for steam from part of said steam conversion unit to said reheater section, a circulator located within the primary coolant loop of the reactor for effecting the circulation of the heat extracting medium therethrough, and a steam turbine connected in said cold reheat line, said steam turbine being connected to said circulator so that steam passing through said cold reheat line to said reheater section effects the driving of said steam turbine and the concomitant actuation of said circulator to establish the necessary circulation rate of the heat extracting medium through the nuclear reactor.

2. A system for effecting the conversion of thermal energy provided by a gas coolant that is circulated through a plurality of parallelly connected primary coolant loops of an operating nuclear reactor into usable electrical energy, which system comprises a plurality of stream generators, one steam generator being connected in each one of said parallelly connected primary coolant loops so that the gas coolant circulated through the reactor passes through said steam generators, each of said steam generators including a superheater section and a reheater section, a steam conversion unit connected to said steam generators for effecting the conversion of energy derived from the steam produced thereby into electrical energy, said conversion unit including a plurality of cold reheat lines that provide parallel paths for steam from part of said steam conversion unit to the reheater sections of said steam generators, a plurality of gas circulators, and a plurality of steam turbines corresponding in number to said gas circulators, one each of said steam turbines being connected to one each of said gas circulators, one circulator being located within each of the primary coolant loops of the reactor for effecting the circulation of the gas coolant therethrough and one each of said steam turbines being serially connected in each of said cold reheat lines so that steam passing through said parallelly connected cold reheat lines effects the driving of said steam turbines and the concomitant actuation of said circulators to establish the necessary circulation rate of the gas coolant through the nuclear reactor.

3. A system for effecting the conversion of thermal energy provided by a heat extracting medium that is circulated through the primary coolant loop of an operating nuclear reactor into usable electrical energy, which system comprises a steam generator connected to the reactor so that the coolant circulated through the primary coolant loop passes through said steam generator, said steam generator including an economizer-evaporator section, a superheater section and a reheater section, at least one turbine-generator unit including a high pressure turbine and a lower pressure turbine connected to electrical generator means to effect the driving thereof and the resultant production of electrical power, first conduit means connecting said superheater section of said steam generator to the inlet of said high pressure turbine, second conduit means connecting the exhaust of said high pressure turbine to said reheater section, a coolant circulator located in the primary coolant loop of the reactor, a steam turbine connected in series in said second conduit means between the exhaust of said high pressure turbine and said reheater section so that steam being delivered from said high pressure turbine to said reheater section drives said steam turbine, said series-connected steam turbine being linked to said coolant circulator so that driving of said turbine effects actuation of said circulator to establish coolant circulation through the primary coolant loop of the reactor, third conduit means connecting the outlet of said reheater section to the inlet of said lower pressure turbine and further conduit means leading from the exhaust of said lower pressure turbine to said economizer-evaporator section.

References Cited by the Examiner

UNITED STATES PATENTS 2,957,815  10/1960  Pacault et al. _____ 60—108

FOREIGN PATENTS 856,632  12/1960  Great Britain.

REUBEN EPSTEIN, *Primary Examiner.*

CARL D. QUARFORTH, *Examiner.*

J. V. MAY, *Assistant Examiner.*